UNITED STATES PATENT OFFICE.

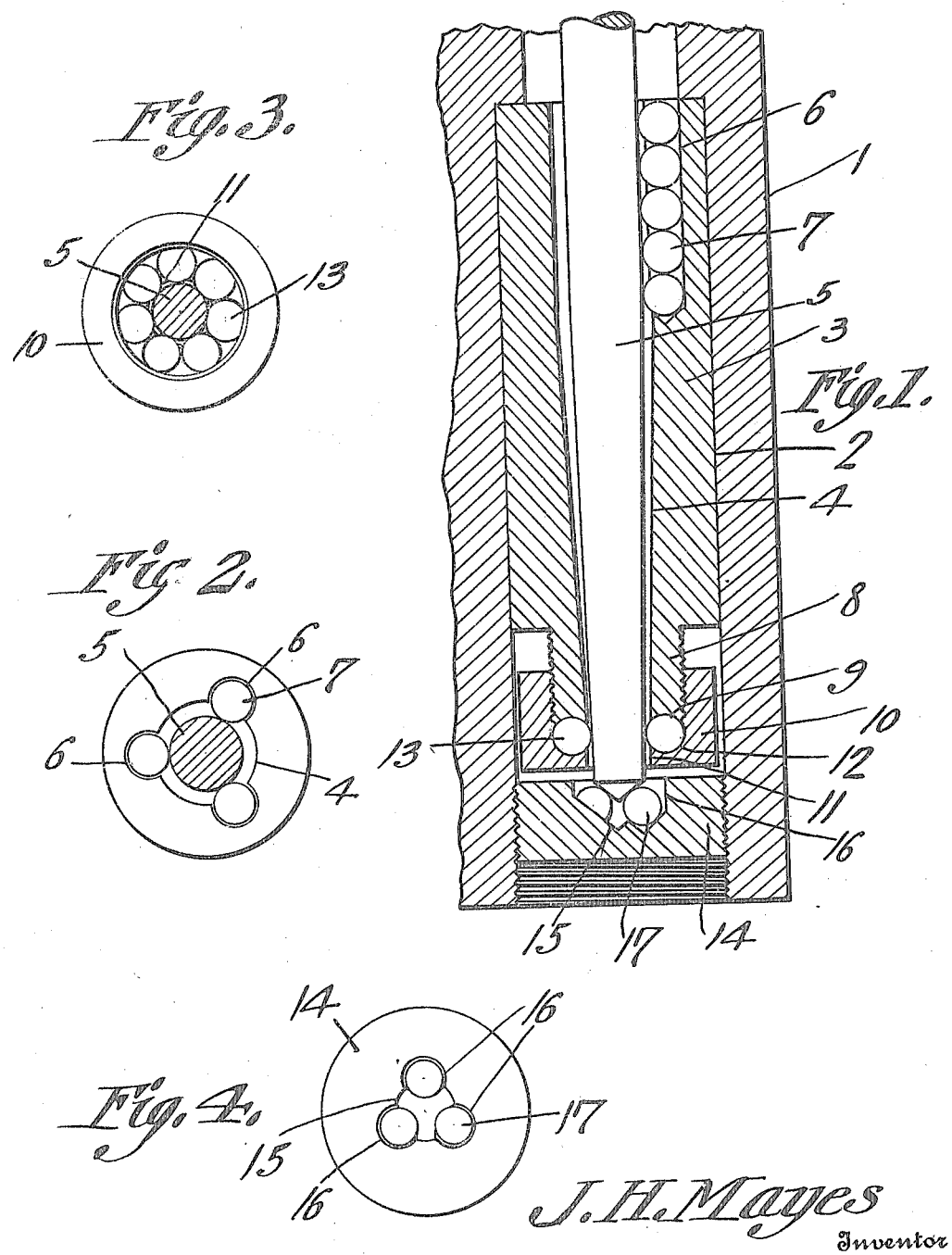

JOHN H. MAYES, OF CHARLOTTE, NORTH CAROLINA.

BALL-BEARING FOR SPINDLES.

1,248,885.   Specification of Letters Patent.   Patented Dec. 4, 1917.

Application filed May 14, 1917. Serial No. 168,423.

*To all whom it may concern:*

Be it known that I, JOHN H. MAYES, a citizen of the United States, residing at Charlotte, in the county of Mecklenburg and State of North Carolina, have invented a new and useful Ball-Bearing for Spindles, of which the following is a specification.

The present invention relates to improvements in bearings for spinning, twisting and roving spindles used in cotton machinery, and it is the object of the invention to provide novel means for mounting a vertical spindle for rotation with a minimum amount of friction, the component elements being assembled in a novel manner to accomplish the desired results.

It is also the object of the invention to provide a ball bearing of the nature indicated which is simple and inexpensive in construction, and the parts of which can be readily separated for cleaning or replacement.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is a vertical central section of the device.

Fig. 2 is an upper end view of the spindle casing or socket member.

Fig. 3 is a plan view of the cap attached to the lower end of said casing.

Fig. 4 is a plan view of the ball cup for supporting the lower end of the spindle.

In the drawing, numeral 1 designates a bolster or supporting member for the vertical tubular spindle casing or socket member 3 fitted within a vertical bore 2 in the bolster or member 1. The casing 3 has a vertical downwardly tapered bore 4 for receiving the lower tapered terminal of the spindle 5 which is spaced from the walls of said bore.

A plurality of bores 6, three, as illustrated, are drilled downwardly into the casing 3 from the upper end thereof and open laterally into the bore 4, and a column of balls 7 is disposed in each bore 6, the lateral openings of the bores being of less width than the diameters of the balls to hold the balls therein, but said balls protrude through the slots or openings of the bores for contact with the spindle, whereby to center the spindle and enable the same to turn with little friction. The balls are disposed loosely within the bores 6 and are of smaller diameter than said bores, so that the balls can turn.

The lower end of the casing 3 has a depending boss 8 of reduced diameter, the end of which is provided with an annular ball race 9, and a cap 10 is threaded upwardly onto the boss 8 and has a central aperture 11 to allow the spindle 5 to project loosely therethrough from the lower end of the casing. The cap 10 has an annular ball race 12 underneath the ball race 9, and an annular set of rolling balls 13 are seated in the ball race 12 snugly underneath the ball race 9, and project inwardly through the annular slot between the ball races 9 and 12 to contact with the spindle and take up the lateral strains, in connection with the balls 7. The balls 13 center the lower extremity of the spindle, while the upper portion of the spindle is steadied by the balls 7, thus holding the spindle in vertical position.

A ball cup 14 is threaded upwardly into the bore 2 underneath the cap 10 and spindle, and is provided with a central recess 15 drilled into the same from above to receive the lower conical end of the spindle, and the cup 14 is further provided with bores or cavities 16 drilled downwardly therein, around and in communication with the recess 15. Balls 17 are seated in the cavities 16 for the contact of the conical end of the spindle therewith, whereby to support the spindle.

The spindle in contacting with the balls 7, 13, and 17 can rotate freely and can be lifted out of the casing or socket member 3. The cup 14 and cap 10 can be readily unscrewed downwardly and removed, thus enabling the parts to be separated and replaced.

Having thus described the invention, what is claimed as new is:—

1. A bearing embodying an upright casing having a reduced boss at its lower end, a cap secured upon said boss and having a central aperture for the projection of a spindle therethrough, said cap having a ball race, and balls working in said ball race underneath said boss.

2. A bearing embodying an upright casing having an annular ball race at its lower end, a cap secured upon a lower end of said casing, a spindle extending through said casing and cap, the cap having a ball race therein, and balls working within said ball race to contact with the spindle.

In testimony that I claim the foregoing as my own, I have hereto affixed my signature in the presence of two witnesses.

JOHN H. MAYES.

Witnesses:
W<small>M</small>. L<small>EE</small>,
F<small>RANK</small> S. T<small>UCKER</small>.